United States Patent
Bork

(10) Patent No.: US 10,636,404 B2
(45) Date of Patent: Apr. 28, 2020

(54) METHOD FOR COMPENSATING FOR INTERFERING NOISES IN A HANDS-FREE APPARATUS IN A MOTOR VEHICLE, AND HANDS-FREE APPARATUS

(71) Applicant: Volkswagen Aktiengesellschaft, Wolfsburg (DE)

(72) Inventor: Simon Bork, Calberlah (DE)

(73) Assignee: VOLKSWAGEN ATIENGESELLSCHAFT, Wolfsburg (DE)

( * ) Notice: Subject to any disclaimer, the term of this patent is extended or adjusted under 35 U.S.C. 154(b) by 0 days.

(21) Appl. No.: 16/044,796

(22) Filed: Jul. 25, 2018

(65) Prior Publication Data
US 2019/0035378 A1    Jan. 31, 2019

(30) Foreign Application Priority Data
Jul. 27, 2017    (DE) .................. 10 2017 212 980

(51) Int. Cl.
G10K 11/178    (2006.01)
G10L 21/0208    (2013.01)
H04M 9/08    (2006.01)

(52) U.S. Cl.
CPC ........ *G10K 11/178* (2013.01); *G10L 21/0208* (2013.01); *H04M 9/082* (2013.01); *G10K 2210/1282* (2013.01); *G10L 2021/02082* (2013.01)

(58) Field of Classification Search
None
See application file for complete search history.

(56) References Cited

U.S. PATENT DOCUMENTS

| 5,426,703 A | * | 6/1995 | Hamabe | G10K 11/178 |
| | | | | 381/71.12 |
| 5,706,344 A | * | 1/1998 | Finn | G10K 11/178 |
| | | | | 379/406.09 |
| 5,740,256 A | | 4/1998 | Castello Da et al. | 381/94.7 |

(Continued)

FOREIGN PATENT DOCUMENTS

| DE | 112009001303 B4 | 2/1916 | ............. G10L 15/20 |
| DE | 19533541 C1 | 3/1997 | ............. B60R 16/02 |

(Continued)

OTHER PUBLICATIONS

German Office Action, Application No. 102017212980.8, 6 pages, dated Feb. 20, 2018.

*Primary Examiner* — Paul W Huber
(74) *Attorney, Agent, or Firm* — Slayden Grubert Beard PLLC

(57) ABSTRACT

The invention relates to a method for compensating for interfering noises in a hands-free apparatus in a motor vehicle as well as a hands-free apparatus in a motor vehicle, comprising at least one microphone, at least one loudspeaker, a control device with at least one adaptive filter as well as a transmitting and receiving apparatus, wherein a pre-filter is arranged before the adaptive filter or predetermined filter coefficients (w[n]) are saved in the adaptive filter, wherein the filter coefficients (w[n]) minimize a vehicle-specific acoustic error signal of the vehicle interior.

21 Claims, 3 Drawing Sheets

(56) References Cited

U.S. PATENT DOCUMENTS

| | | | | |
|---|---|---|---|---|
| 5,768,124 A * | 6/1998 | Stothers | G10K 11/178 | 700/38 |
| 6,212,273 B1 * | 4/2001 | Hemkumar | H03G 3/3005 | 379/392 |
| 6,434,110 B1 * | 8/2002 | Hemkumar | H04M 9/082 | 370/201 |
| 6,560,332 B1 * | 5/2003 | Christensson | H04B 3/23 | 379/406.01 |
| 6,650,756 B1 * | 11/2003 | Saito | H03H 21/0012 | 381/71.11 |
| 6,839,670 B1 | 1/2005 | Stammler et al. | | 704/251 |
| 8,130,941 B2 | 3/2012 | Taniguchi et al. | | 379/406.08 |
| 8,270,626 B2 * | 9/2012 | Shridhar | G10K 11/17885 | 381/71.14 |
| 8,565,443 B2 | 10/2013 | Wurm | | 381/71.11 |
| 8,731,207 B2 | 5/2014 | Kuech et al. | | 381/66 |
| 10,121,464 B2 * | 11/2018 | Lee | G10K 11/1781 | |
| 10,163,432 B2 * | 12/2018 | Every | G10K 11/178 | |
| 2001/0055985 A1 * | 12/2001 | Matt | H04M 9/082 | 455/570 |
| 2005/0207585 A1 * | 9/2005 | Christoph | G10K 11/178 | 381/71.11 |
| 2008/0031471 A1 * | 2/2008 | Haulick | H03G 3/32 | 381/86 |
| 2008/0118083 A1 * | 5/2008 | Mitsuhata | G10K 11/178 | 381/94.3 |
| 2009/0316923 A1 * | 12/2009 | Tashev | H04M 9/082 | 381/66 |
| 2010/0049516 A1 | 2/2010 | Talwar et al. | | 704/251 |
| 2010/0183165 A1 * | 7/2010 | Sato | H03H 21/0012 | 381/71.11 |
| 2011/0070926 A1 | 3/2011 | Vitte et al. | | 455/569.2 |
| 2011/0235693 A1 * | 9/2011 | Lee | H04S 7/00 | 375/224 |
| 2013/0211828 A1 | 8/2013 | Gratke et al. | | 704/226 |
| 2013/0304475 A1 | 11/2013 | Gratke et al. | | 704/270 |
| 2017/0125006 A1 * | 5/2017 | Dzhigan | G10K 11/17881 | |
| 2019/0156813 A1 * | 5/2019 | Starobin | H04R 27/00 | |

FOREIGN PATENT DOCUMENTS

| | | | |
|---|---|---|---|
| DE | 10235347 C1 | 10/2003 | B06B 1/06 |
| DE | 69631955 T2 | 1/2005 | G10K 11/178 |
| RU | 2495506 C2 | 2/2012 | H04M 9/08 |
| WO | 99/39497 A1 | 8/1999 | H03H 21/00 |
| WO | 2014/138758 A2 | 9/2014 | G10L 21/0216 |

* cited by examiner

METHOD FOR COMPENSATING FOR INTERFERING NOISES IN A HANDS-FREE APPARATUS IN A MOTOR VEHICLE, AND HANDS-FREE APPARATUS

CROSS-REFERENCE TO RELATED APPLICATIONS

This application claims priority to German Application No. 10 2017 212 980.8 filed Jul. 27, 2017, the contents of which are hereby incorporated by reference in their entirety.

TECHNICAL FIELD

The invention relates to a method for compensating for interfering noises in a hands-free apparatus in a motor vehicle, and a hands-free apparatus.

In motor vehicles, the compensation of interfering noises in a hands-free apparatus is imperative, since otherwise no understandable signals could be received or sent. Therefore, adaptive filters are known that are also known as echo cancellation filters. These filters adapt their filter coefficients during operation. A problem in this case is that the adaptation is either very slow and exact or fast and inexact.

Therefore, filter coefficients are determined for vehicle models in advance that can then be adapted more quickly in active operation. However, this adaptation process is still very slow and difficult.

A method for compensating for interfering noises in a hands-free apparatus in a motor vehicle is known from US 2013/0304475 A1, wherein the motor vehicle is a convertible, wherein a first set of filter coefficients is stored for a closed top and a second set of filter coefficients is stored for an open top. Depending on the position of the top, the corresponding set of filter coefficients is then selected.

SUMMARY

An object of this invention is to improve a method for compensating for interfering noises in a hands-free apparatus in a motor vehicle as well as to create an improved hands-free apparatus.

The above object is solved by a method with the features of claim 1 as well as a hands-free apparatus with the features of claim 2. Further embodiments of the invention are described in the dependent claims and the following description.

In one aspect, a method for compensating for interfering noises in a hands-free apparatus in a motor vehicle is provided that uses at least one microphone, at least one loudspeaker, a control device with at least one adaptive filter, as well as a transmitting and receiving apparatus. A known acoustic test signal (e.g., white noise) is output in the vehicle via the at least one loudspeaker and the filter coefficients of the adaptive filter are determined in order to determine an acoustic error signal. These determined filter coefficients are saved in a pre-filter of the adaptive filter or in the adaptive filter itself. Then, the acoustic residual error is compensated for in active operation by means of the adaptive filter.

The above aspect considerably simplifies and accelerates the compensation process. The basic idea is that each vehicle has an individual acoustic behavior in the vehicle interior, which is different depending on the type of seat covers (leather, imitation leather and cloth), size of the vehicle interior (small with a divider directly behind the driver or vans for transporting passengers and goods with a large interior, or respectively typical passenger vehicle interiors) as well as the number of individual additional interior furnishings. The different positioning of the at least one loudspeaker and the at least one microphone in the respective vehicle interior also plays a role. According to the invention, each vehicle is now automatically acoustically measured. This process can occur relatively quickly (e.g., 5-10 s), to which the filter coefficients are adapted in a relatively large step width. In active operation, only a deviation that, for example, is caused by the occupants or the load must then be compensated for. Since this deviation is still only very low, the optimum can be found very quickly despite the small step width and the residual error can accordingly be minimized.

In another aspect, a hands-free apparatus is provided that comprises at least one microphone, at least one loudspeaker, a control device with at least one adaptive filter as well as a transmitting and receiving apparatus, wherein a pre-filter is arranged before the adaptive filter or predetermined vehicle-specific filter coefficients are saved in the adaptive filter, wherein the filter coefficients minimize a vehicle-specific acoustic error signal of the vehicle interior.

The details of one or more embodiments are set forth in the accompanying drawings and the description below. Other features will be apparent from the description, drawings, and from the claims.

In one embodiment, the control device comprises a signal generator that is designed to output a known acoustic test signal via the at least one loudspeaker. This signal generator is then activated for the determination of the filter coefficients and then deactivated. The activation of this measurement can either be triggered manually or automatically at the end of the line after the final assembly of the vehicle. Accordingly, measuring devices do not have to be separately connected.

In another embodiment, the adaptive filter has an algorithm according to a gradient search method (e.g., LMS algorithm [least mean square]), which has proven particularly suitable.

In another embodiment, the control device has a noise suppression unit that is arranged between the adaptive filter and the transmitting and receiving apparatus. By means of the noise suppression unit, in particular driving noises due to the engine, the exhaust system and wind noises can be filtered out that are accordingly not also transmitted.

In another embodiment, a receiving pre-processing unit is arranged between the transmitting and receiving apparatus and the at least one loudspeaker, wherein the receiving pre-processing unit is designed to generate a reference signal for a transmitting pre-processing unit. Accordingly, signals emitted via the loudspeaker that are picked up by the microphone are already filtered out early. Further functions of the pre-processing units are signal boosting and distortion correction.

In another embodiment, the control device is designed such that the size of the residual error can be specified so that the time for the calibration routine can be optimized.

In another embodiment, the control device is designed such that the number of filter coefficients of the adaptive filter can be specified so that the different vehicle interior size for the calibration routine can be optimized. More filter coefficients are needed for large vehicle interiors due to the longer reverb tail.

In another embodiment, the control device is designed such that the last respectively valid filter coefficients are saved in the adaptive filter and maintain their validity. This provides the advantage that the adaptation typically occurs more quickly at the start of the next journey.

The invention is explained in the following in more detail using further exemplary embodiments.

Figure 1:
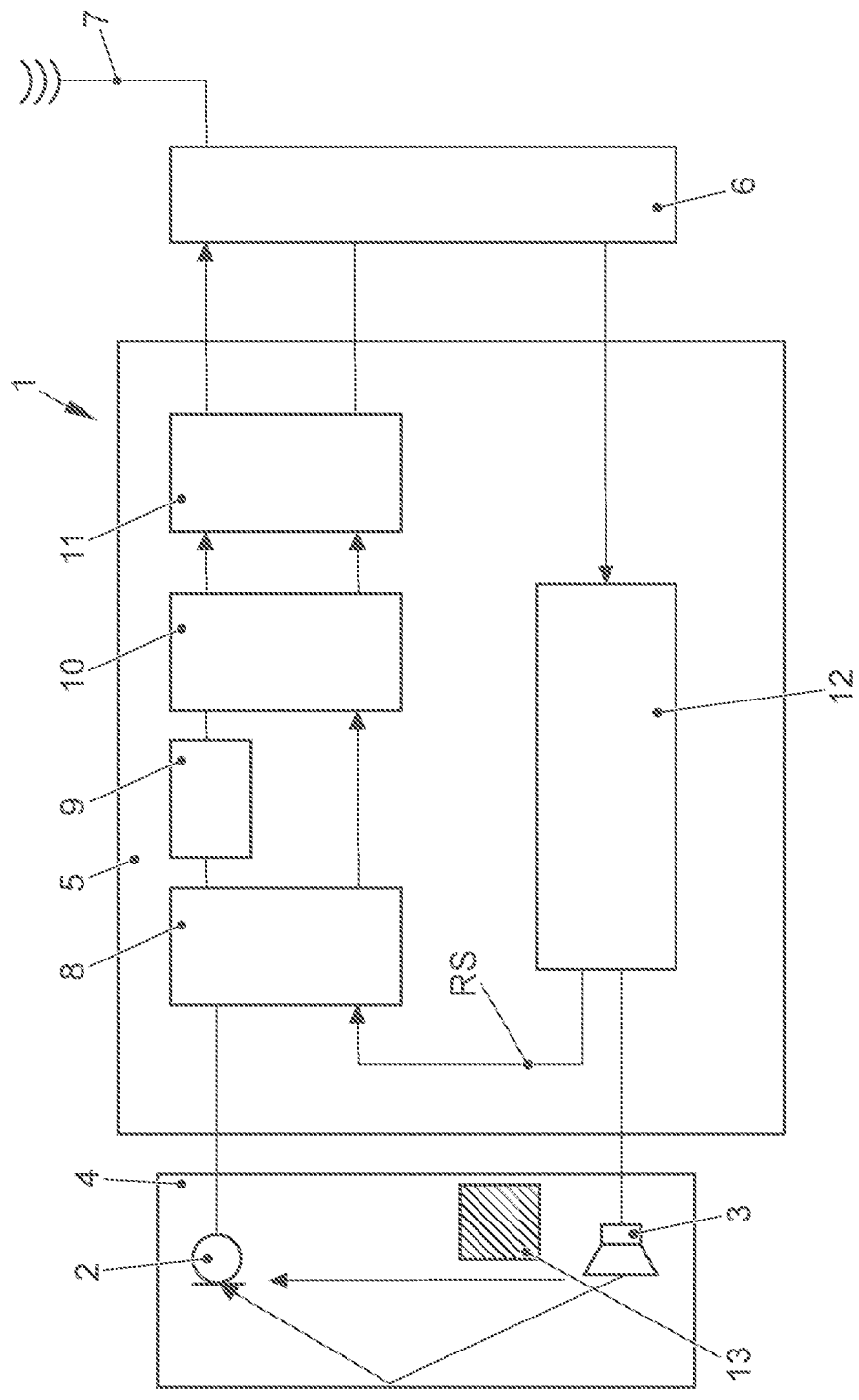
FIG. 1 shows a schematic representation of a hands-free apparatus according to an embodiment.

FIG. 1 schematically represents a hands-free apparatus 1 in a motor vehicle. The hands-free apparatus 1 has at least one microphone 2 and one loudspeaker 3 that are arranged in a vehicle interior 4. The hands-free apparatus 1 further has a control device 5 and a transmitting and receiving apparatus 6 with an antenna 7. The control device 5 has a transmitting pre-processing unit 8, a pre-filter 9, an adaptive filter 10, a noise suppression unit 11 and a receiving pre-processing unit 12. A person 13 who influences the acoustics (in particular the propagation) is further schematically represented in the vehicle interior 4.

The acoustic signals picked up by the microphone 2 are boosted and distortions therein are corrected in the transmitting pre-processing unit 8, wherein a reference signal RS is subtracted that takes into account the portions that the microphone 2 picks up but that were emitted by the loudspeaker 3. This pre-processed transmitting signal is then filtered via the pre-filter 9, wherein the pre-filter 9 takes into account the acoustic propagation of the vehicle interior 4 without persons 13, wherein the determination of the filter coefficients of the pre-filter 9 will be explained in more detail later.

This pre-filtered signal is then fed to the adaptive filter 10, which then attempts to compensate for the remaining residual error by adapting its filter coefficients (e.g., with an LMS algorithm). The output signal is then freed from noises from the surroundings by the noise suppression unit 11 and is emitted by the transmitting and receiving apparatus 6.

It is noted that the transmitting and receiving apparatus 6 can also be integrated into the control device 5. Furthermore, the antenna 7 or another emergency antenna can also be integrated in the control device 5, which is activated if, for example, the antenna 7 is damaged in an accident.

Figure 2:
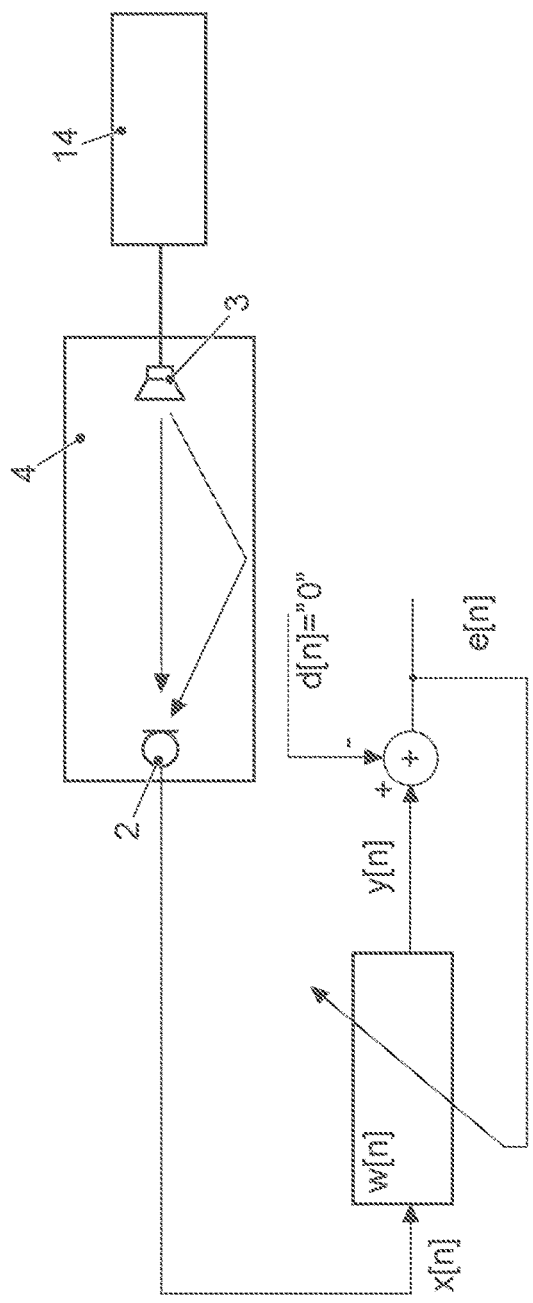
FIG. 2 shows a schematic representation of a measuring apparatus for determining the filter coefficients of a pre-filter according to an embodiment.
Figure 3:
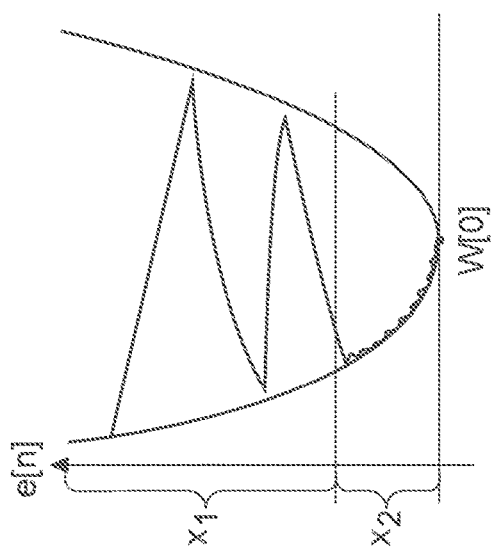
FIG. 3 shows a schematic representation of the error signal according to an embodiment.

The determination of the filter coefficients of the pre-filter 9 will now be explained with reference to FIG. 2 and FIG. 3. After the final assembly of the vehicle, all doors and windows of the motor vehicle are closed at the end of the line and a signal generator 14 is activated that generates a known acoustic test signal that is emitted via the loudspeaker 3. The signal generator 14 is hereby arranged, for example, in the receiving pre-processing unit 12 and can be selectively switched on. This known acoustic test signal is detected by the microphone 2 and fed to the adaptive filter 10 as an input signal $x[n]$. The output signal $y[n]$ is linked to a desired signal $d[n]$ that is typically zero. The deviation from the desired signal $d[n]$ is the error signal $e[n]$ that is fed back to the adaptive filter 10. The adaptive filter 10 then adapts its filter coefficients $w[n]$ in order to minimize the error signal $e[n]$. The rate of change of the adaptation of the filter coefficients is in this case the step width. This step width can now first be chosen very large, since the goal is not the Wiener solution $w[0]$ (see FIG. 3) but rather a solution that is as close as possible at the transition from x1 to x2 in active operation.

The vehicle-specific filter coefficients $w[n]$ determined in this way are then saved in the pre-filter 9 or in the adaptive filter 10 itself (in the latter case the pre-filter 9 can also be omitted).

In active operation with persons 13, the acoustic behavior changes. Due to the filter coefficients $w[n]$ of the pre-filter 9, the adaptive filter 10 does not start in the upper part of the parabola of the error function $e[n]$, but rather at the transition region from x2 to x1 so that it, despite a small step width, can reach the Wiener solution $w[0]$ in real operation very quickly (high convergence rate).

The hands-free apparatus 1 can hereby be used, for example, as an emergency call system.

Figure 4:
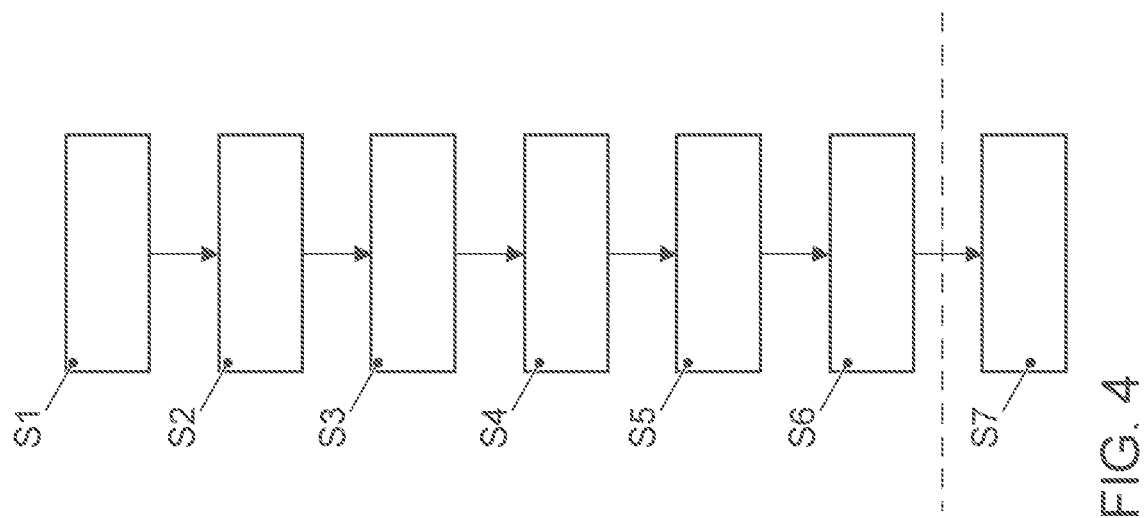
FIG. 4 shows a schematic flow diagram of a method according to an embodiment.

FIG. 4 schematically represents a flow diagram of the method. In a first step S1, windows and doors of the motor vehicle are closed at the end of the line after the final assembly of the vehicle. In a second step S2, the signal generator 14 is activated and a known acoustic test signal is emitted via the loudspeaker 3. In a third step S3, the known acoustic test signal is picked up by the microphone 2 and fed to the adaptive filter 10 as an input signal. In a fourth step S4, an error signal is determined based on the output signal of the adaptive filter 10 and the desired signal (typically zero) and is fed back to the adaptive filter 10, which then adapts with a step width of its filter coefficients in order to minimize the error signal. In a fifth step S5, this process is completed, i.e., the filter coefficients have adapted to the vehicle interior and form an inverse filter that largely compensates for the acoustic influence of the vehicle interior 4. In a sixth step S6, these filter coefficients are saved in the pre-filter 9 or are adopted as start values for the adaptive filter 10. With this, the calibration routine is ended, which is indicated by the horizontal line. In active operation, one or more persons now sit in the vehicle interior 4 and influence the acoustic behavior of the vehicle interior 4. In a seventh step S7, the remaining interference variables due to these persons 13 are then compensated for by adapting the filter coefficients of the adaptive filter 10, wherein the majority of the interference due to the vehicle interior is already compensated for by the pre-filter so that the rest of the error signal is already very small and can be compensated for very quickly by means of the adaptive filter. Accordingly, a very quick vehicle-specific compensation of interference variables of a hands-free apparatus results.

The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measured cannot be used to advantage. Any reference signs in the claims should not be construed as limiting the scope.

What is claimed is:

1. A method for compensating for interfering signals in a hands-free apparatus in a motor vehicle, using at least one microphone, at least one loudspeaker, a control device with at least one adaptive filter, as well as a transmitting and receiving apparatus, comprising the following method steps, conducted during an initial calibration routine, wherein during the initial calibration routine a motor vehicle interior is without a person:
- a) outputting a known acoustic test signal via the at least one loudspeaker,
- b) determining filter coefficients (w[n]) of the adaptive filter in order to minimize an acoustic error signal, the error signal representing an acoustic influence of an interior of the motor vehicle, and
- c) saving the filter coefficients (w[n]) determined in the method step b) in a pre-filter of the adaptive filter or in the adaptive filter itself;
- d) further adapting the filter coefficients (w[n]) when operating the motor vehicle with at least one person being present in the motor vehicle interior.

2. The method of claim 1, wherein the initial calibration routine is conducted prior to use of the hands-free apparatus.

3. The method of claim 1, wherein the known acoustic test signal is a noise signal.

4. The method of claim 1, wherein the known acoustic test signal comprises white noise.

5. The method of claim 1, wherein the initial calibration routine is triggered manually or automatically at the end of the line after the final assembly of the motor vehicle.

6. The method of claim 5, wherein the initial calibration routine is performed with windows and doors of the motor vehicle closed.

7. A hands-free apparatus in a motor vehicle, comprising at least one microphone, at least one loudspeaker, a control device with at least one adaptive filter comprising filter coefficients, as well as a transmitting and receiving apparatus, wherein a pre-filter comprising pre-filter coefficients is arranged before the adaptive filter or predetermined filter coefficients (w[n]) are saved in the adaptive filter, wherein at least some of the pre-filter coefficients or the predetermined filter coefficients (w[n]) are obtained during an initial calibration routine of an interior of the motor vehicle, wherein the motor vehicle is without a person during the initial calibration routine, and wherein the pre-filter coefficients or the predetermined filter coefficients (w[n]) minimize a vehicle-specific acoustic error signal of the interior and wherein the control device is configured to further adapt the filter coefficients (w[n]) of the adaptive filter when operating the motor vehicle with at least one person being present in the motor vehicle.

8. The hands-free apparatus according to claim 7, wherein the control device comprises a signal generator that is designed to output a known acoustic test signal via the at least one loudspeaker at least during the initial calibration routine.

9. The hands-free apparatus according to claim 7, wherein the adaptive filter comprises an algorithm according to a gradient search method.

10. The hands-free apparatus according to claim 7, wherein the control device has a noise suppression unit that is arranged between the adaptive filter and the transmitting and receiving apparatus, which noise suppression unit is configured to attenuate one or more of driving noises and wind noises.

11. The hands-free apparatus according claim 7, wherein a receiving pre-processing unit is arranged between the transmitting and receiving apparatus and the at least one loudspeaker, wherein the receiving pre-processing unit is configured to generate a reference audio signal for a transmitting pre-processing unit.

12. The hands-free apparatus according to claim 7, wherein the control device is configured such that the size of the residual error can be specified.

13. The hands-free apparatus according to claim 7, wherein the control unit is designed such that the number of filter coefficients of the adaptive filter can be specified.

14. The hands-free apparatus according to claim 7, wherein the control device is configured such that the last respectively valid filter coefficients w[n] are saved in the adaptive filter and maintain their validity.

15. The hands-free apparatus according to claim 8, wherein the adaptive filter comprises an algorithm according to a gradient search method.

16. The hands-free apparatus according to claim 8, wherein the control device has a noise suppression unit that is arranged between the adaptive filter and the transmitting and receiving apparatus, which noise suppression unit is configured to attenuate one or more of driving noises and wind noises.

17. The hands-free apparatus according to claim 9, wherein the control device has a noise suppression unit that is arranged between the adaptive filter and the transmitting and receiving apparatus, which noise suppression unit is configured to attenuate one or more of driving noises and wind noises.

18. The hands-free apparatus according claim 8, wherein a receiving pre-processing unit is arranged between the transmitting and receiving apparatus and the at least one loudspeaker, wherein the receiving pre-processing unit is configured to generate a reference audio signal for a transmitting pre-processing unit.

19. The hands-free apparatus according claim 9, wherein a receiving pre-processing unit is arranged between the transmitting and receiving apparatus and the at least one loudspeaker, wherein the receiving pre-processing unit is configured to generate a reference audio signal for a transmitting pre-processing unit.

20. The hands-free apparatus of claim 7, wherein the initial calibration routine is conducted prior to use of the hands-free apparatus.

21. A hands-free apparatus in a motor vehicle, comprising at least one microphone, at least one loudspeaker, a control device with a pre-filter comprising pre-filter coefficients, wherein the pre-filter receives an output signal of the microphone, at least one adaptive filter comprising filter coefficients, wherein the adaptive filter receives an output signal of the pre-filter, and a transmitting and receiving apparatus receiving an output signal of the adaptive filter, wherein at least some of the pre-filter coefficients are obtained during an initial calibration routine of a motor vehicle interior, wherein the motor vehicle interior is without a person during the initial calibration routine, and wherein the pre-filter coefficients minimize a vehicle-specific acoustic error signal of the interior and wherein the control device is configured to further adapt the filter coefficients (w[n]) of the adaptive filter when operating the motor vehicle with at least one person being present in the motor vehicle.

* * * * *